US008573280B2

(12) United States Patent
Marxen

(10) Patent No.: US 8,573,280 B2

(45) Date of Patent: Nov. 5, 2013

(54) PRESS CUSHION FOR A HYDRAULIC PRESS

(75) Inventor: Martin Marxen, Viersen (DE)

(73) Assignee: HUECK Rheinische GmbH, Viersen (DE)

( * ) Notice: Subject to any disclaimer, the term of this patent is extended or adjusted under 35 U.S.C. 154(b) by 343 days.

(21) Appl. No.: 13/136,066

(22) Filed: Jul. 21, 2011

(65) Prior Publication Data

US 2012/0018933 A1 Jan. 26, 2012

(30) Foreign Application Priority Data

Jul. 21, 2010 (DE) ........................ 10 2010 036 539

(51) Int. Cl.
*B32B 37/00* (2006.01)

(52) U.S. Cl.
USPC ........................................ 156/581; 156/583.3

(58) Field of Classification Search
USPC .................. 156/228, 580, 581, 583.1, 583.3; 100/295; 442/181, 182, 183; 139/420 R, 421
See application file for complete search history.

(56) References Cited

U.S. PATENT DOCUMENTS

| | | | | | |
|---|---|---|---|---|---|
| 5,120,597 | A * | 6/1992 | Takimoto et al. | ............. | 442/136 |
| 5,298,322 | A * | 3/1994 | Hennecken et al. | .......... | 442/229 |
| 5,855,733 | A * | 1/1999 | Douglas et al. | ............ | 156/583.1 |
| 6,413,889 | B1 * | 7/2002 | Best et al. | ..................... | 442/305 |
| 6,780,280 | B2 * | 8/2004 | Halterbeck et al. | ........ | 156/583.3 |
| 7,465,371 | B2 * | 12/2008 | Bachmann | ................. | 156/583.3 |
| 8,444,798 | B2 * | 5/2013 | Yoshida | ........................ | 156/228 |

FOREIGN PATENT DOCUMENTS

| | | | |
|---|---|---|---|
| DE | 3826776 | A1 | 2/1990 |
| DE | 20 2007 006 849 | U1 | 7/2008 |
| EP | 2 189 276 | A1 | 5/2010 |

* cited by examiner

*Primary Examiner* — James Sells

(74) *Attorney, Agent, or Firm* — Von Rohrscheldt Patents

(57) ABSTRACT

A press cushion (7, 17, 27) for a hydraulic press (1) including a first layer (9, 19, 39) which is impermeable to fluids and includes an elastomeric material and fibers connected therewith; a second layer (10, 20, 40) connected with the first layer (9, 19, 39), wherein the second layer is also impermeable to fluids, wherein the first layer (9, 19, 39) is provided with a plurality of channels (15, 22, 28, 36) on its side oriented towards the second layer (10, 20, 40), wherein the channels include a material that is flow-capable at least at the operating temperature of the press (1). Additionally the channels (15) are closed fluid tight at least through the second layer (10, 20, 40).

22 Claims, 2 Drawing Sheets

PRESS CUSHION FOR A HYDRAULIC PRESS

RELATED APPLICATIONS

This application claims priority from and incorporates by reference German patent application 10 2010 036 539.4 filed on Jul. 21, 2010.

FIELD OF THE INVENTION

The invention relates to a press cushion for a hydraulic press, the press cushion including a first layer that is impermeable to fluids, wherein the first layer includes an elastomeric material and fibers connected therewith and a second layer connected with the first layer, wherein the second layer is also impermeable to fluids.

BACKGROUND OF THE INVENTION

A press cushion of this type is known from EP 0 235 582 A2. The known press cushion shall be used in particular for producing multi-layer and flexible circuit boards for printed electronic circuits in so-called high-pressure presses. Press cushions for producing materials for electronic circuit boards are produced using high pressures (up to approximately 1000 $N/cm^2$ or 100 bar) and also high temperatures (up to approximately 220° C.) through a lamination process. The sandwich shaped press cushions include a reinforcement layer made from fibers, for example in the form of a central glass fiber woven material in order to reduce the deformation during press operations and also when removing the finished pressed product and when inserting a new press blank to increase the service life of the press cushion. Furthermore press cushions for printed circuit board production are typically configured with anti-adhesion layers on their surfaces, for example in the form of a foil made from polytetrafluorethylene (PTFE). Furthermore it is important to prevent an abrasion of fibers or particles from the press cushion during operations of high pressure press cushions of this type since abrasion of this type would contaminate the circuit board material and would thus lead to a degraded quality or even technical non-usability of the circuit board material.

Press cushions are furthermore often used for producing wood materials with coated surfaces. Laminates of this type are typically used for furniture production and as flooring materials. Thus decorative layers in the form of abrasion resistant plastic foils with various decors (imitation wood, imitation tile, imitation stone) are applied, for example, to wood fiber boards ("particle boards" or multidirectional fiber (MDF) boards). The connection between the decorative layer and the carrier material of the fiber board is typically provided using melamine resin which is cured under pressure and temperature (up to 50 bar or 500 $N/cm^2$ pressing pressure and up to 220° C. press temperature) in a laminating press.

When using press cushions for circuit board production and also when applying a decorative layer to fiber materials, the purpose of the press cushions is to compensate thickness or height tolerances in the hydraulic press. Thickness or height tolerances of this type result from dimensional tolerances in the press blank (fiber board or decorative foil or conductor base material), however, in particular in the press itself. Thus, press units typically include heatable press plates with dimensions of several meters so that besides production tolerances also problems occur through plate warping through different temperature distributions during press operations. Also for so-called press plates which come in contact with the press material on both sides dimensional tolerances can occur. Thus, an important feature of press cushions is compensating such dimensional tolerances in the system "heat plate—press plate—press blank—press plate—heat plate." In order to permanently provide a thickness compensation of this type without damaging the press cushion the press cushion has to have sufficient elastic properties, this means spring elastic properties which bring it back again into its original shape independently after unloading the pressure. Typically elastomeric materials are used for the known press cushions in order to obtain the desirable spring properties. In particular silicone elastomeric materials, fluoro-elastomeric materials or fluoro-silicone elastomeric materials are being used for press cushions due to their favorable temperature stability and their resistance against various chemical substances.

Due to the good heat conductivity required for press cushions which facilitates the necessary fast heat transfer from the heat plate through the press cushion and the press plate into the press blank, the press cushions typically include components made from materials with good heat conductivity, in particular metals. Typically copper and/or brass and/or stainless steel and/or other metal alloys are used for this purpose.

The known press cushions can be divided in principle into press cushions including textile flat materials and press cushions which include a closed material layer. A press cushion with a closed material layer is known for example from DE 23 19 593 A or EP 1 300 235 A. In order to provide reliable integrity of the press cushions also under high pressing pressures and during handling a woven support material for example made from bronze fibers is embedded in the silicon elastomeric material that is being used. In order to improve heat conductivity the press cushion according to EP 1 300 235 A includes a surface overhang of the metallic support woven material beyond the elastomeric material. In order to further increase heat conductivity particles with high heat conductivity (for example, metal powder or silica powder) can be introduced into the elastomeric material.

As recited supra, many press cushions are flat textile materials which can be configured in particular configured as woven materials, knitted materials or fleece materials. This way, based alone on the geometry of the press cushion or of the threads processed therein a good shape change capability and therefore a good thickness compensation is assured.

This applies in particular when the threads have high indigenous elasticity in a direction transversal to their longitudinal axes, in particular when they are made from elastomeric material or have a tension resistant core (for example, made from metal or a synthetic fiber) which is encased in elastomeric material. Press cushions of this type are known for example from EP 0 735 949 A, EP 1 136 248 A and EP 1 779 999 A in the form of woven press cushions. Press cushions based on knitted materials are disclosed in particular in EP 1 033 237 A or EP 1 040 910 A and EP 1 040 909 A. In order to provide particularly good point elasticity to the press cushion, it is known from EP 1 386 723 A to use jacketed fibers alternating with the elastomeric material, wherein the elasticity of the fibers transversal to the longitudinal axis of the thread alternates between being higher or lower. Furthermore press cushions or press cushion—press plate combinations are know in which a coherent cavity of the press cushion or of the combination is filled with a material that is flow-capable at the operating temperature of the press (EP 2 189 276).

A disadvantage of the mat-shaped press cushions according to DE 23 19 593 A is their comparatively high stiffness and lack of point elasticity. On the other hand side the press cushions which are configured as flat textile materials are comparatively complex to produce. This applies in particular when jacketed threads are being used, possibly with different types, wherein the material of the core has to be provided with the elastomeric jacket material during an extrusion process in a first step. The textile processing that is performed in a second step (weaving or knitting) is very complex again, since the processed elastomeric threads or metal threads contrary to classic textiles cause a substantially more difficult and slower manufacture.

BRIEF SUMMARY OF THE INVENTION

Thus, it is the object of the invention to provide a press cushion which is characterized by good punctiform elasticity and simple producibility.

Starting with a press cushion as recited supra, the object is achieved in that the first layer is provided with a plurality of channels on its side facing the second layer, wherein a material is included in the channels that is flow-capable at least at the operating temperature of the press and wherein the channels are closed fluid tight at least through the second layer.

The arrangement and dimension of the channels facilitates adjusting the elastic properties of the cushion over its surface in a very individual and simple manner. The cushion properties according to the invention can also be varied within a wide range on the one hand side through the elastic properties of the elastomeric material and of the material in the channels that is flow-capable at the operating temperature of the press on the other hand side. Furthermore it is possible in a simple manner to provide different effective elasticities in various zones of the press cushion.

According to an exemplary embodiment a third layer is provided in addition to the first and the second layer, wherein the third layer is connected with the first layer on a side of the first layer that is oriented away from the second layer and the third layer is also impermeable to fluids. Thus, either the first layer is also provided with another plurality of channels on its side oriented towards the third layer or the third layer is provided with another plurality of channels on its side oriented towards the first layer. In the latter case the third layer like the first layer includes an elastomeric material and fibers connected therewith. In any case the additional plurality of channels is closed fluid tight through the connection between the first layer and the third layer.

This way two levels of channels are provided which further increases the options to configure the elasticity distribution and elasticity characteristics.

Typically the press cushion according to the invention is rectangular like the existing press units and is free from channels at least in an edge portion, preferably circumferentially in all edge portions. The width as a function of the respective heat plate format of the at least one edge portion is advantageously between 1 cm and 20 cm. In the recited edge portions a full surface continuous fluid tight connection between the first layer and the second layer or the first layer and the third layer can be established in a simple manner, since a comparatively large surface contact can be established. Therefore the edge portions are configured in particular for closing the channels in their face directions in order to provide fluid tightness also in this direction.

It is particularly advantageous when the first layer and the second layer and/or the first layer and the third layer are glued or welded together, wherein in particular also a laser welding technique or an ultrasound welding technique are advantageously usable.

According to an exemplary embodiment of the invention the plurality of channels includes a first group of channels which extend parallel to one another, wherein advantageously a second group of channels is provided which extend in turn parallel to one another and perpendicular to the channels of the first group. Thus it is possible that the channels of both groups communicate with one another or not. The latter case creates a system of intersecting channels that are connected with one another. The channels then advantageously extend within a plane or form a single "channel layer." In case the two groups do not communicate with one another they are preferably offset from one another in thickness direction of the press cushion so that two "channel layers" are provided that are separate from one another. When groups of channels intersect a particularly homogeneous distribution of the channels over the surface of the press cushion is achieved so that local deviations in the elasticity of the press cushion can be small. With respect to producing the press cushion according to the invention the channels can be introduced into the respective layer through master forming, in particular through casting or blade coating in a respective mold or through forming, in particular embossing stamping or cutting, or material removing, in particular through laser processing or milling.

In order to obtain elasticity properties of the cushion over its entire surface that can be predetermined particularly well a particular number of channels or all channels shall be filled with the material that is flow-capable at press operating temperature. A material that is flow-capable at press operating temperature shall be any fluid, this includes a compressible fluid (gas) or any incompressible fluid (liquid). At temperatures below the operating temperature the material can also be provided in solid form. For fluids for the press cushion according to the invention in particular air or other (inert) gases or oils (mineral or synthetic oils or mixtures thereof) are suitable or inert liquids or metals with a low melting point. These are in particular lead or zinc alloys which include at least one of the recited elements and which may be provided in solid form at ambient temperature.

While the plurality of the channels can also be partially arranged in the first and in the second layer as well as in the first and in the third layer it is particularly advantageous due to the simpler producibility when the second layer and/or the third layer includes a foil with a thickness between 10 μm and 1000 μm and includes a polymer or is made from a polymer, advantageously, for example, polytetrafluorethylene (PTFE) or fluororubber or silicon or fluorsilicon elastomeric materials.

In order to assure the integrity of the press cushion long-term also under high variable pressure loadings the first layer and/or the second layer and/or the third layer can include a support fabric which is embedded in the elastomeric material, preferably a silicon elastomeric material or a fluoro elastomeric material or a fluorsilicon elastomeric material or a blend elastomeric material, including at least two of the recited elastomeric materials. A measure increasing the stability of the press cushion can include that the fibers included at least in the first layer are high temperature resistant synthetic fibers, in particular fibers made from aramide, Kevlar® (trade name of du Pont for poly-paraphenylene terephthalamide fiber), Nomex® (trade name of du Pont for meta-aramid or m-aramid fiber), polyester, melamine resin, carbon, glass or metal wires, in particular made from brass, copper, stainless steel. Thus, the fibers can be provided as monofilament fibers or multifilament fibers, wherein advantageously the fibers are provided as particular staple fibers with a length between 1 mm and 50 mm and/or in the form of a textile flat material, in particular a woven material, a knitted material, a laid tape material or a fleece.

Since elastomeric materials typically have rather low heat conductivity, the elastomeric material of the first layer and/or of the third layer and/or the material that is flow-capable at press operating temperature and has high heat conductivity can include in particular metal powder or silica powder. This facilitates accelerating the heat transfer to the press blank in particular for press systems which are operated with short cycle times which in turn facilitates reducing the heating plate temperature.

Typically the surface portion of the channels with respect to the entire surface of the press cushion is between 5% and 50%, advantageously between 10% and 20%. When channels are arranged in plural channel layers the channels in all layers have to be considered. When the channels are arranged on top of one another in plural layers, only the channels of one single layer are to be used for computing the recited surface portion.

While the distribution of the channels in the portion of the heater plates or press plates for non-problematic press units is typically homogeneous an inhomogeneous distribution of the channels can be intentionally provided for press systems with variable pressure distributions that cause pressure problems. The non-homogeneity can thus be configured so that the distance of adjacent channels from one another is greater or smaller in particular portions of the press cushion than in other portions of the press cushion and/or so that in particular portions of the press cushion the dimensions of the channels, in particular their width and/or depth is greater or less than in other portions of the press cushion.

Thus, it is provided according to the invention that the width of the channels is between 5 mm and 20 mm and/or the depth of the channels measured in a direction perpendicular to a surface of the press cushion is between 1 mm and 5 mm and/or the distance between adjacent parallel channels from one another is between 1 mm and 50 mm.

BRIEF DESCRIPTION OF THE DRAWINGS

The invention is described in more detail with reference to plural embodiments of a press cushion with reference to drawing figures, wherein.

DETAILED DESCRIPTION OF THE INVENTION

Figure 1:
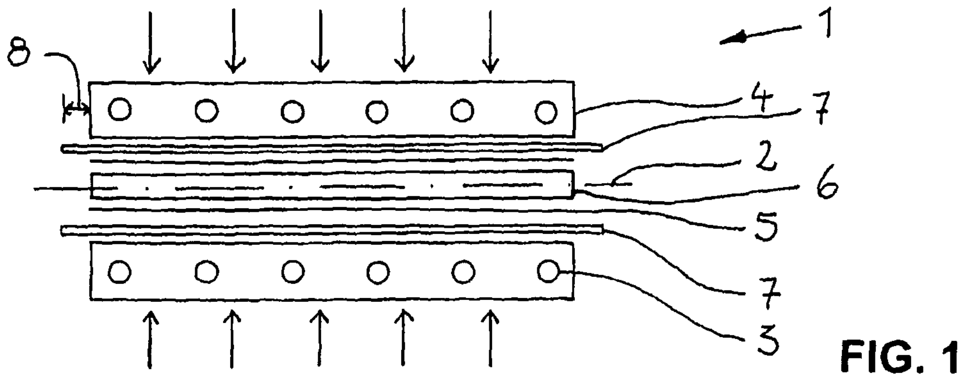
FIG. 1 illustrates a vertical sectional view through a heating press.

A press schematically illustrated in FIG. 1 is configured mirror symmetrical to a horizontal center plane 2 and includes two heating plates 4 provided with a plurality of heating channels 3 and two metal press plates 5 which are oriented towards a centrally arranged press blank with their surfaces that are oriented towards one another and in particular engraved. The press blank is, for example, a multidirection al fiberboard (MDF) plate to be coated which is provided with a decorative foil on both sides, wherein the decorative foil shall be connected with the MDF plate through a melamine resin under pressure and temperature.

In order to compensate thickness tolerances in the press blank 6 and other height differences in the press plates 5 and also in the heating plates 4, for example through warping, a press cushion 7 is arranged respectively between a press plate 5 and the associated heating plate 4. The press cushion protrudes with edge portions 8 on all sides beyond the rectangular heating plate 4 and beyond the press plate 5 which has the same dimension which is used for attachment purposes. The configuration of the press cushion 7 is illustrated in more detail in the vertical sectional view according to FIG. 2. The press cushion 7 is illustrated in an exploded view in which a central first layer 9 and an upper second layer 10 and a lower third layer 11 are drawn offset from one another for illustration purposes. In reality the three layers 9, 10, 11 are connected permanently and in particular fluid tight with one another as will be subsequently described in more detail.

The press cushion 7 and also the first layer 9 are configured symmetrical to the center plane 2. In the center plane 2 a woven support material 12 with cloth binding is embedded in the interior of the first layer 9 in its elastomeric material, in particular a silicon elastomeric material wherein an undulating chaining thread and the cut filling threads are visible from the woven support material. Above a top side 13 of the first layer 9 and below a bottom side 14 of the first layer 9 there is the second layer 10 and the third layer 11.

The presence of a first plurality of channels 15 in the top side 13 of the first layer 9 is essential for the press cushion 7 according to the invention and for the present embodiment also the presence of a second plurality of channels 16 in the bottom side 14 of the first layer 9. The channels 15 and also the channels 16 respectively extend within their “group” but also with respect to the channels 15, 16 of both groups parallel to one another and are arranged equidistant from one another. The channels 15 in the top side 13 of the first layer 9 are thus arranged offset from one another by the amount of half the distance of respectively adjacent channels 15, 16 so that a typical “gap” arrangement is provided.

In order to obtain channels 15, 16 that are closed fluid tight the top side 13 of the first layer 9 is glued or welded together with the second layer 10. An optional glue layer made from a known glue is not illustrated in the figures for simplicity reasons. The second layer 10 is a foil, for example, made from silicon elastomeric material. The same applies with reference to the bottom side of the press cushion 7 for the connection of the third layer 11 with the bottom side 14 of the first layer 9. As described infra in more detail with reference to another embodiment of the invention the edge portions of the press cushion 7 are circumferentially free from channels 15, 16, so that the latter are also closed fluid tight on their face sides. In the present case of the press cushion 7 the channels 15, 16 are filled with air. However, also filling with any other gas is conceivable as well as a filling with other liquids or a metal or a metal alloy which is provided in liquid form at the operating temperature of the press of approximately 80 to 220° C.

Figure 2:
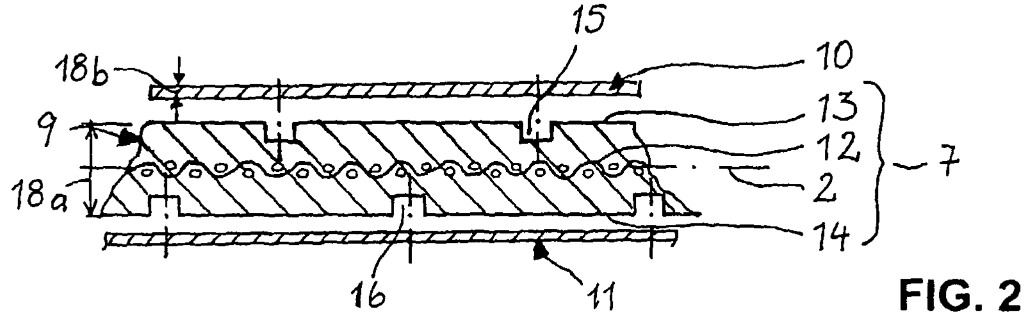
FIG. 2 illustrates an exploded vertical sectional view of a first embodiment of a press cushion.

Differently from the three layer configuration according to FIG. 2, the press cushion according to FIG. 17 only includes a two-layer configuration. Thus, a fluid tight connection between a first layer 19 and a second layer 20 is provided. Starting from a top side 21 of the first layer 19 the channels 22 are arranged in the first layer 19. The channels 22 extend in a parallel and equidistant manner in a direction parallel to the top side 21 of the press cushion 17 at a distance 23 from one another.

A depth 24 of the channels 22 (measured from the top side 21 of the first layer 19) is approximately 1 mm. A width 25 measured perpendicular to the depth 24 is 2 mm. A thickness

26*a* of the first layer 19 is 2 mm, whereas a thickness 26*b* of the second layer 20 is approximately 1 mm.

Figure 3:
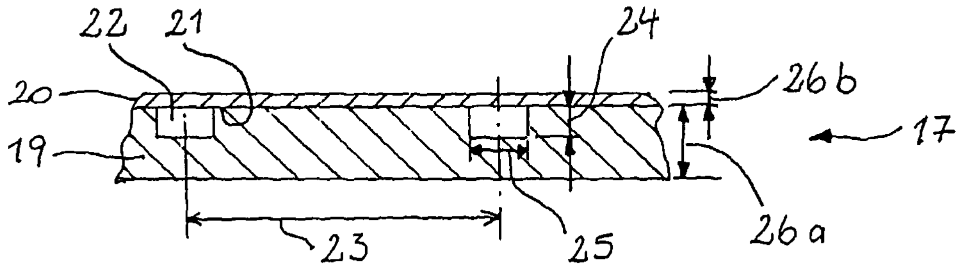
FIG. 3 illustrates a vertical sectional view of a second embodiment of a press cushion.
Figure 5:
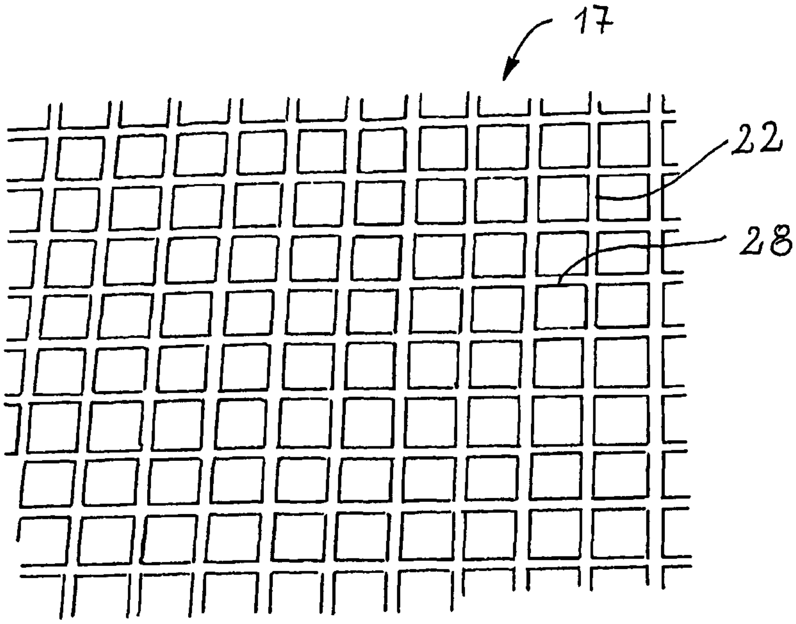
FIG. 5 illustrates a perspective view of a first layer of the press cushion according to FIG. 3.

It is evident from the view according to FIG. 5 that the press cushion 17 according to FIG. 3 does not only have a first group of channels 22 that are parallel to one another but also a second group of channels 28 extending perpendicular thereto and within the second group in a parallel and equidistant manner. This way a checkered pattern is formed on the top side 21 of the first layer 19.

Figure 6:
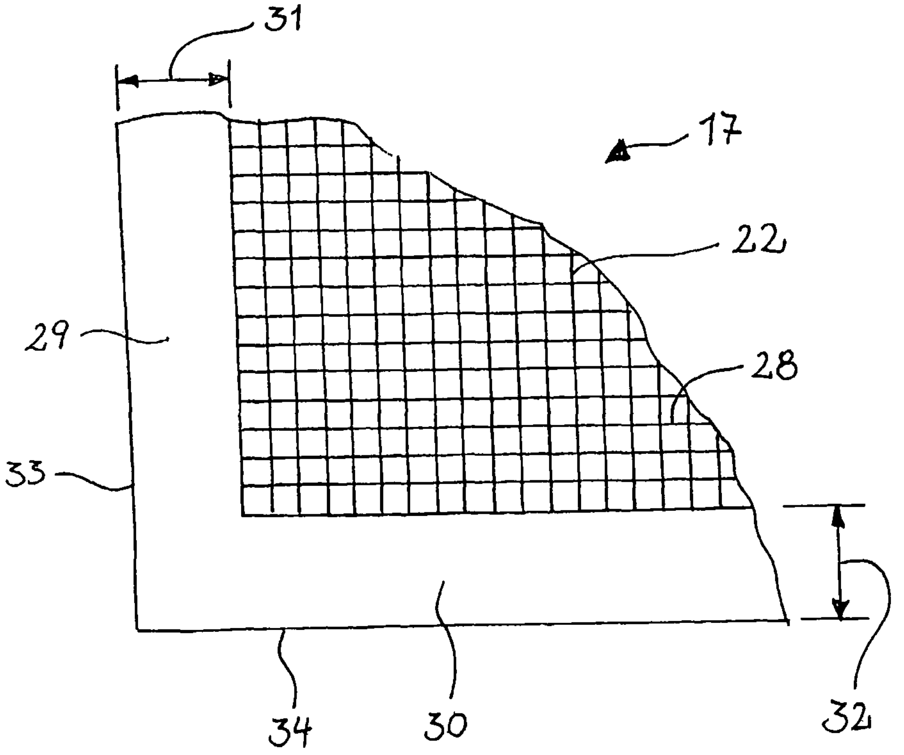
FIG. 6 illustrates a top view of a corner portion of the first layer of the press cushion according to FIG. 3.

FIG. 6 illustrates that circumferential edge portions 30 of the press cushion 17 are provided free from channels. The edge portions 29, 30 have a width 31, 32 of approximately 1 cm. The edge portions 29, 30 preferably protrude beyond the heat plates 4 and the press plates 5 of the press 1 in a lateral direction and are thus, contrary to a center portion of the press cushion 17 provided with the channels 22, 28, not arranged in the portion transmitting pressure forces during press operation. Due to the edge portions 29, 30 the channels 22, 28 terminate short of the edges 33, 34 of the press cushion 17 and thus provide a face side fluid tight closure for the channels 22, 28.

Figure 4:
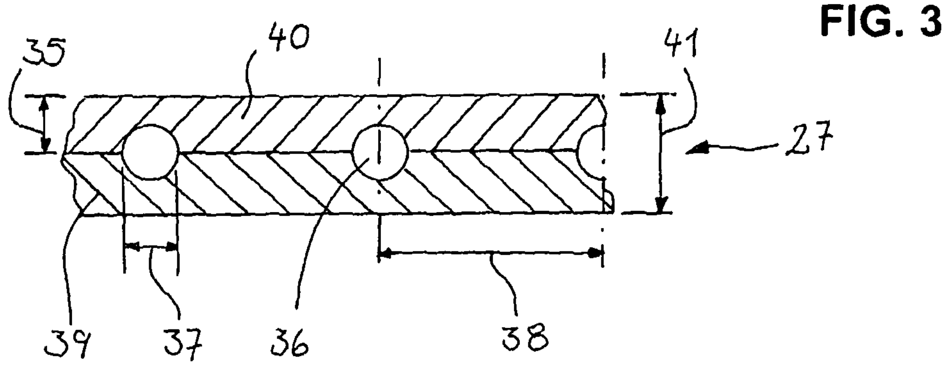
FIG. 4 illustrates a vertical sectional view of a third embodiment of a press cushion.

An alternative embodiment of a press cushion 27 is illustrated in a vertical sectional view in FIG. 4. The press cushion 27 includes a first layer 39 and a second layer 40 glued to the first layer fluid tight, wherein both of them are made from an elastomeric material, in particular a silicon elastomeric material and both have the same thickness 35 of approximately 1 mm.

The channels 36 of the press cushion 27 that extend equidistant and parallel from one another have circular cross-sections and are respectively configured by half in the first layer 39 and by half in the second layer 40. In each layer 39, 40 there are semicircular channel halves in cross-section which complement each other to form a complete channel 36 with circular cross-section when joining the identically configured first and second layer 39, 40. When producing the press cushion 27 it is therefore very important that the distance 38 of adjacent channels 36 is exactly identical and the fluid tight connection of the first and the second layers 39, 40 is provided in the same manner so that the channels 36 form with circular cross-sections. A diameter 37 of the channel 36 is 1.5 mm which corresponds at a total thickness of the press cushion of 3.5 mm to a length percentage of approximately 43%.

The elastomeric materials of all recited press cushions 7, 17, 27 can be provided from heat conducting material in particular metal powder for increasing the heat conductivity through particles. The same also applies for the material by which the channels 15, 16, 22 are filled in as far as this is a liquid like, for example, oil.

REFERENCE NUMERALS AND DESIGNATIONS

| | |
|---|---|
| 1 | press |
| 2 | center plane |
| 3 | heating channel |
| 4 | heating plate |
| 5 | press plate |
| 6 | press material |
| 7 | press cushion |
| 8 | edge portion |
| 9 | first layer |
| 10 | second layer |
| 11 | third layer |
| 12 | support woven material |
| 13 | topside |
| 14 | bottom side |
| 15 | channel |
| 16 | channel |
| 17 | press cushion |
| 18a | thickness |
| 18b | thickness |
| 19 | layer |
| 20 | layer |
| 21 | top side |
| 22 | channel |
| 23 | distance |
| 24 | depth |
| 25 | width |
| 26a | thickness |
| 26b | thickness |
| 27 | press cushion |
| 28 | channel |
| 29 | edge portion |
| 30 | edge portion |
| 31 | width |
| 32 | width |
| 33 | edge |
| 34 | edge |
| 35 | thickness |
| 36 | channel |
| 37 | diameter |
| 38 | distance |
| 39 | first layer |
| 40 | second layer |
| 41 | thickness |

What is claimed is:

1. A press cushion for a hydraulic press comprising:
a first layer which is impermeable to fluids and includes an elastomeric material and fibers connected therewith; and
a second layer connected with the first layer,
wherein the second layer is impermeable to fluids,
wherein the first layer is provided with a plurality of channels on its side oriented towards the second layer,
wherein the plurality of channels include a material that is flow-capable at least at the operating temperature of the press and
wherein the plurality of channels are closed fluid tight at least through the second layer.

2. The press cushion according to claim 1,
wherein a third layer is connected with the first layer on a side of the third layer oriented away from the second layer and the third layer is impermeable to fluids,
wherein either the first layer is provided with another plurality of channels on a side of the first layer oriented towards the third layer or the third layer is provided with another plurality of channels on the side of the third layer oriented towards the first layer, and
wherein in the latter case the third layer includes an elastomeric material and fibers connected therewith and the another plurality of channels is closed fluid tight through the connection between the first layer and the third layer.

3. The press cushion according to claim 1,
wherein the press cushion is rectangular and at least one edge portion is free from channels.

4. The press cushion according to claim 1, wherein
the first layer and the second layer, or
the first layer and the third layer are glued or welded together.

5. The press cushion according claim 1,
wherein the plurality of channels includes a first group of channels which extend parallel to one another.

6. The press cushion according to claim 1, wherein the plurality of channels are introduced into the respective layer through master forming.

7. The press cushion according to claim 1, wherein a particular number of channels or all of the plurality of channels are completely filled with the material that is flow capable at the operating temperature of the press.

8. The press cushion according to claim 1, wherein the material arranged in the plurality of channels is a gas, a liquid, or a metal that is solid at ambient temperature but liquid at an operating temperature of the press.

9. The press cushion according to claim 1, wherein the second layer or the third layer includes a foil with a thickness between 10 μm and 1,000 μm and includes a polymer.

10. The press cushion according to claim 1, wherein the first layer, the second layer or the third layer includes a woven support material which is embedded in an elastomeric material.

11. The press cushion according to claim 1, wherein the fibers included in the first layer are high temperature resistant synthetic fibers from the group including aramide, melamine resin, Nomex®, Kevlar®, carbon, or glass, or metal wires from the group including brass, copper, stainless steel and aluminum.

12. The press cushion according to claim 1, wherein the fibers included in the first layer are provided as mono filament or multi filament threads, wherein the fibers are provided as particular staple fibers with a length between 1 mm and 50 mm or in the form of a woven material, a knitted material, a laid tape or a fleece.

13. The press cushion according to claim 1, wherein particles with high heat conductivity are embedded in the elastomeric material of the first layer or of the third layer or in the material that is flow capable at the operating temperature of the press.

14. The press cushion according to claim 1, wherein a surface portion of the channels with reference to an entire surface of the press cushion is between 5% and 50%.

15. The press cushion according to claim 1, wherein a distribution of the plurality of channels over the surface of the press cushion is inhomogeneous such that a distance of adjacent channels from one another is greater or smaller in portions of the press cushion or a width or depth of the plurality of channels is greater or smaller than in other portions of the press cushion.

16. The press cushion according to claim 1, wherein a width of the plurality of channels is between 5 mm and 20 mm, a depth of the plurality of channels measured in a direction perpendicular to a surface of the press cushion is between 1 mm and 5 mm, or a distance of adjacent parallel channels from one another is between 1 mm and 50 mm.

17. The press cushion according to claim 1, wherein the press cushion is rectangular and all circumferential edge portions of the press cushion are free from channels, and wherein a width of the circumferential edge portions are between 1 cm and 20 cm.

18. The press cushion according claim 5, wherein a second group of channels is provided which in turn extend parallel to one another and perpendicular to the channels of the first group, and wherein the channels of the first and second groups are connected with one another.

19. The press cushion according claim 5, wherein a second group of channels is provided which in turn extend parallel to one another and perpendicular to the channels of the first group, and wherein the channels of the first and second groups are not connected with one another.

20. The press cushion according to claim 6, wherein the master forming is through casting or blade coating in a respective mold or through forming embossing, stamping or cutting or in a material removing manner with laser processing or milling.

21. The press cushion according to claim 10, the elastomeric material is a silicone elastomeric material, a fluoro elastomeric material, a fluoro silicone elastomeric material or a blend elastomeric material including at least two elastomeric materials from the group including silicone elastomeric material, fluoro elastomeric material, and fluoro silicone elastomeric material.

22. The press cushion according to claim 14, wherein the surface portion of the channels with reference to the entire surface of the press cushion is between 10% and 30%.

* * * * *